United States Patent [19]

Hatano

[11] Patent Number: 5,654,768
[45] Date of Patent: Aug. 5, 1997

[54] PAL-SYSTEM ADAPTIVE COLOR-SIGNAL DEMODULATOR

[75] Inventor: Takahisa Hatano, Sapporo, Japan

[73] Assignee: Matsushita Electric Industrial Co., Ltd., Osaka, Japan

[21] Appl. No.: 622,809

[22] Filed: Mar. 27, 1996

[30] Foreign Application Priority Data

Mar. 27, 1995 [JP] Japan ................................. 7-067732

[51] Int. Cl.⁶ .................................................. H04N 9/66
[52] U.S. Cl. .................................. 348/640; 348/638
[58] Field of Search .................... 348/507, 509, 348/638, 640, 649, 654, 726, 727; 358/23; H04N 5/455, 9/66

[56] References Cited

U.S. PATENT DOCUMENTS 4,786,963  11/1988  McNeely et al. .
5,512,960   4/1996  Hatano ................................. 348/638

FOREIGN PATENT DOCUMENTS 171288   3/1989   Japan .

*Primary Examiner*—Sherrie Hsia
*Attorney, Agent, or Firm*—Ratner & Prestia

[57] ABSTRACT

A PAL system demodulator capable of delivering high quality color signals even in the cases of poor vertical correlation comprising 1H delay line 1 delaying the chroma signal by one horizontal period, 1H delay-line 2 delaying a reference signal by one horizontal period wherein the output of the 1H delay line 1 is defined by reference signal, color demodulating circuit 3 canceling hue error by conducting an operation between the scanning lines covering from the input and the output of the 1H delay line 1, color-demodulating circuit 4 canceling the hue error by conducting an operation between the scanning lines covering from the input and the output of the 1H delay line 2, vertical correlation detecting circuit 5 detecting the vertical correlation between the chroma signal of the reference signal and the chroma signal of the adjoining line or the chroma signal of the adjoining line separated by one-line, and selector 6 selecting the output of the color demodulating circuit 3 or the output of color demodulating circuit 4.

4 Claims, 5 Drawing Sheets tion is now conducted at B-Y demodulator 305 by using said
PAL-SYSTEM ADAPTIVE COLOR-SIGNAL DEMODULATOR

FIELD OF THE INVENTION

The present invention relates to a color-signal demodulator capable of delivering two color difference signals from the PAL-system chroma signals. By using the PAL system, the hue error caused by the phase distortion of transmission signal produced in the transmission line can be canceled. That is, whereas the R-Y signal among two color difference signals is modulated at the transmitter by changing the phase of sub-carrier by 180 degrees at every line before the signal is transmitted, the color demodulation at the receiver is performed by using a 1H delay line and by conducting an operation between the lines. By employing this system, the hue error can be canceled each other.

The PAL system color demodulator employing this demodulation system is named as a first PAL-system color demodulator here.

In addition to this, like the case of NTSC system, another color demodulating system wherein the color demodulation can be completed within one line without using a 1H delay line, is possible. In this case, the R-Y signal components are demodulated at the receiver by changing the phase of sub-carrier by 180 degrees at every line. However, in this case, the hue error caused by the phase distortion possible in the transmission line can not be canceled out within line producing a difference in the color difference signal demodulated within the receiver. However, by utilizing the integration effect of eyes, the hue error produced between the adjoining lines can be made inconspicuous. The PAL system color signal demodulator using this demodulation system is called as a second PAL system color demodulator here.

The operation of these conventional PAL system color demodulators is now explained below by referring the attached drawings. FIG. 2 showing a block diagram of the first PAL system color demodulator. 201 in FIG. 2 is a first PAL system color demodulator, 202 is a sub-carrier generator generating the sub-carrier signal, 203 is a delay line delaying the inputted chroma signal by 1H, 204 is a phase invertor inverting the phase of inputted chroma signal, 205 is a first adder adding the inputted chroma signal and the chroma signal delayed by 1H, 206 is a second adder adding the chroma signal of which phase is inverted by said phase invertor and the 1H delayed chroma signal, 207 is a phase shifter shifting the phase of generated sub-carrier by 90 degrees, 208 is a line switch inverting the phase of sub-carrier in synchronous with the PAL line alternation signal which is inverted between the lines, 209 is a B-Y demodulator demodulating the B-Y signal by using the sub-carrier signal obtained by phase shifting the output of said first adder 205 by 90 degrees using said phase shifter circuit 207, and 210 is a R-Y demodulator demodulating the R-Y signal by using the sub-carrier signal of which phase is shifted by 180 degrees at every line switching the output of said second adder by using said line switch 208.

The operation of thus constructed first PAL system color demodulator is now explained below.

The inputted chroma signal is delayed first by 1H using 1H delay line 203, and the inputted chroma signal and the 1H delayed chroma signal are added by first adder 205. Since the modulation phase of R-Y signal is inverted at every line with the PAL system, the R-Y signal components in the output of adder 205 are canceled out leaving only the B-Y signal components.

Moreover, the phases of chroma signal are inverted by phase invertor 204 and is added to said 1H delayed chroma signal by using second adder 206. Since the B-Y signal components in the output of second adder 206 are canceled, only the R-Y signal components are left. The phase of sub-carrier signal (with a frequency of Fsc=4.43 MHz) generated by sub-carrier generator is shifted by 90 degrees by means of phase shifter 207, and is inputted into said B-Y demodulator 209. Simultaneously, the B-Y signal component which is the output of the first adder 205 is inputted to B-Y demodulator 209, and is synchronously detected by said sub-carrier signal of which phase is shifted by 90 degrees and is demodulated and outputted as the B-Y signal.

Since the burst signal of PAL system is changed alternatively to at a reference angle of +135° or −135° at every line before it is transmitted, the line alternation signal generator (not shown) generates the line alternation signal by comparing the phase of burst signal with the phase of sub-carrier signal generated by sub-carrier generator 202. The output of line switch 208 is then inputted into R-Y demodulator 210. The sub-carrier signal is inverted at every line by using line switch 208. The output of line switch 208 is then inputted into the R-Y signal demodulator 210, and the R-Y signal component outputted from second adder 206 is inputted to R-Y demodulator 210, and is synchronously detected by the sub-carrier signal which is inverted at every line by means of line switch 208, and is demodulated to be outputted as the R-Y signal. This color demodulator is able to cancel the phase distortion of chroma signal produced in the transmission line by conducting an operation between the lines.

Although said first PAL system color demodulator has to be provided with a 1H delay line beside this, a second PAL system color demodulator needing no 1H delay line is available also.

FIG. 3 shows a block diagram of said second PAL system color demodulator. In FIG. 3, 301 is a second PAL system color demodulator, 302 is a sub-carrier generator generating the sub-carrier signal, 303 is a phase shifter shifting the phase of sub-carrier signal by 90 degrees, 304 is a line switch inverting the phase of sub-carrier signal in synchronous with the PAL line alternation signal of which phase is inverted between the lines, 305 is a B-Y demodulator demodulating the B-Y signal by using the sub-carrier obtained by shifting the phase of chroma signal by 90 degrees by means of said phase shifter 303, and 306 is a R-Y demodulator obtaining the R-Y signal by using the sub-carrier signal obtained by shifting the phase of chroma signal by 180 degrees at every line by means of said line switch 304.

The operation of thus constructed second PAL system color demodulator is now explained below by referring FIG. 3.

The chroma signal is inputted first into B-Y demodulator 305 and R-Y demodulator 306. The phase of the sub-carrier signal generated by sub-carrier generator 302 is shifted by 90 degrees by means of phase shifting circuit 303, and is inputted into B-Y demodulator 305. The synchronous detection is then conducted at B-Y demodulator 305 by using said 90 degree phase shifted signal in order to demodulate the B-Y signal. Moreover, the sub-carrier signal generated by sub-carrier generator 302 is inputted into line switch 304.

As mentioned above, with the PAL system, the phase of burst signal is changed alternatively with respect to a reference angle of +135° or −135° at every line before it is transmitted. The line alternation signal generator (not shown) generates the line alternation signal by comparing the phase of burst signal with the phase of sub-carrier signal generated by sub-carrier generator 202.

In synchronous with said alternation signal, the phase of sub-carrier signal is inverted at every line by means of line switch 304, and is outputted.

The sub-carrier signal of which phase is shifted by 180 degrees at every line by means of line switch 304 is inputted into R-Y demodulator 306 wherein the synchronous detection is carried out by using the output of said line switch 304 and the R-Y signal is demodulated. Since no 1H delay line is used in this color demodulation system, the hue error caused by the phase distortion of transmission signal possible in the transmission system can not be canceled within every line, a difference in the demodulated hue signals is essentially produced in every line. However, due to the integration effect of eyes, no hue error produced between the adjoining lines can be conspicuous.

As above described, the color demodulation of the first PAL system color demodulation device is operated by utilizing the chroma signal of the line immediately before the referenced line. When very little difference exists between the transmitted color images of adjoining lines, said first PAL system demodulating device is able to correct the hue distortion possible in the transmission system and is able to perform a correct color demodulation.

However, when a significant change exists between the color line images and when no significant correlation exists between the adjoining lines, no correct color demodulation can be obtained.

Moreover, with the second PAL system color demodulating device, a Venetian blind type disturbance is apt to be appeared in the images in proportion to the increase of phase distortion.

SUMMARY OF THE INVENTION

Considering the above-described problems, this invention is to offer a new color demodulation device attaining a high quality color demodulation by using the method explained below even when no significant correlation exists between the chroma signal of a reference signal and the chroma signal of the line immediately before said reference line caused by a large change took place between the color images.

That is, the color demodulation of this invention is performed by detecting the correlation between the chroma signal of a reference signal and chroma signals of the lines adjoining before and after to said reference signal, and by conducting an operation between the adjoining correlated lines based on this result.

In order to solve these problems, the invented PAL system color modulator consists of a first 1H delay line delaying the chroma signal by one horizontal period, a second 1H delay line delaying said reference signal by horizontal period defining the output of said first 1H delay line as a reference signal, a first color demodulating circuit conducting the color demodulation by canceling the hue error by an operation made between the lines comparing the input and the output of said first 1H delay line, a second color demodulating circuit conducting the color demodulation by canceling the hue error by an operation made between the lines comparing the input and the output of said second 1H delay line, a vertical correlation detecting circuit by which the phases of said reference signal and two lines adjoining before and after to said reference signal, and the vertical correlation between said signal and said reference signal is detected, and a selector circuit selecting the output of said first color demodulating circuit or the output of said second color demodulating circuit in accordance to the output of said vertical correlation detecting circuit.

By taking the above described circuit construction, said selector is able to select the output of color demodulating circuit having a higher correlation between two lines by using said vertical correlation detecting circuit.

The input to said vertical correlation detecting circuit may not necessarily be limited within said reference signal and the phase adjusted chroma signals.

In this case, the chroma signals of the adjoining lines separated from said reference signal by a distance of plural lines are phase adjusted respectively, and the vertical correlation between these signals and the reference signal may be detected. In this case also, said selector selects the output of color demodulator employing the line having a stronger correlation among said two lines, and outputs.

Thus, since the PAL color demodulator of this invention detects the correlation between said reference signal and the lines adjoining before and after (or upper and lower) to said reference line, selects the said reference signal and the chroma signal having a stronger correlation by an operation, and selects and outputs the output of color demodulation circuit, the color demodulation of higher accuracy can be obtained even if the distortion of chroma signal produced in the transmission line is large, or if a larger change of image color signal is produced.

DETAILED DESCRIPTION OF THE INVENTION

A few of the preferred embodiments of the invention are now explained below by referring FIGS. 1(a) and 1(b).

The First Exemplary Embodiment

Figure 1A:
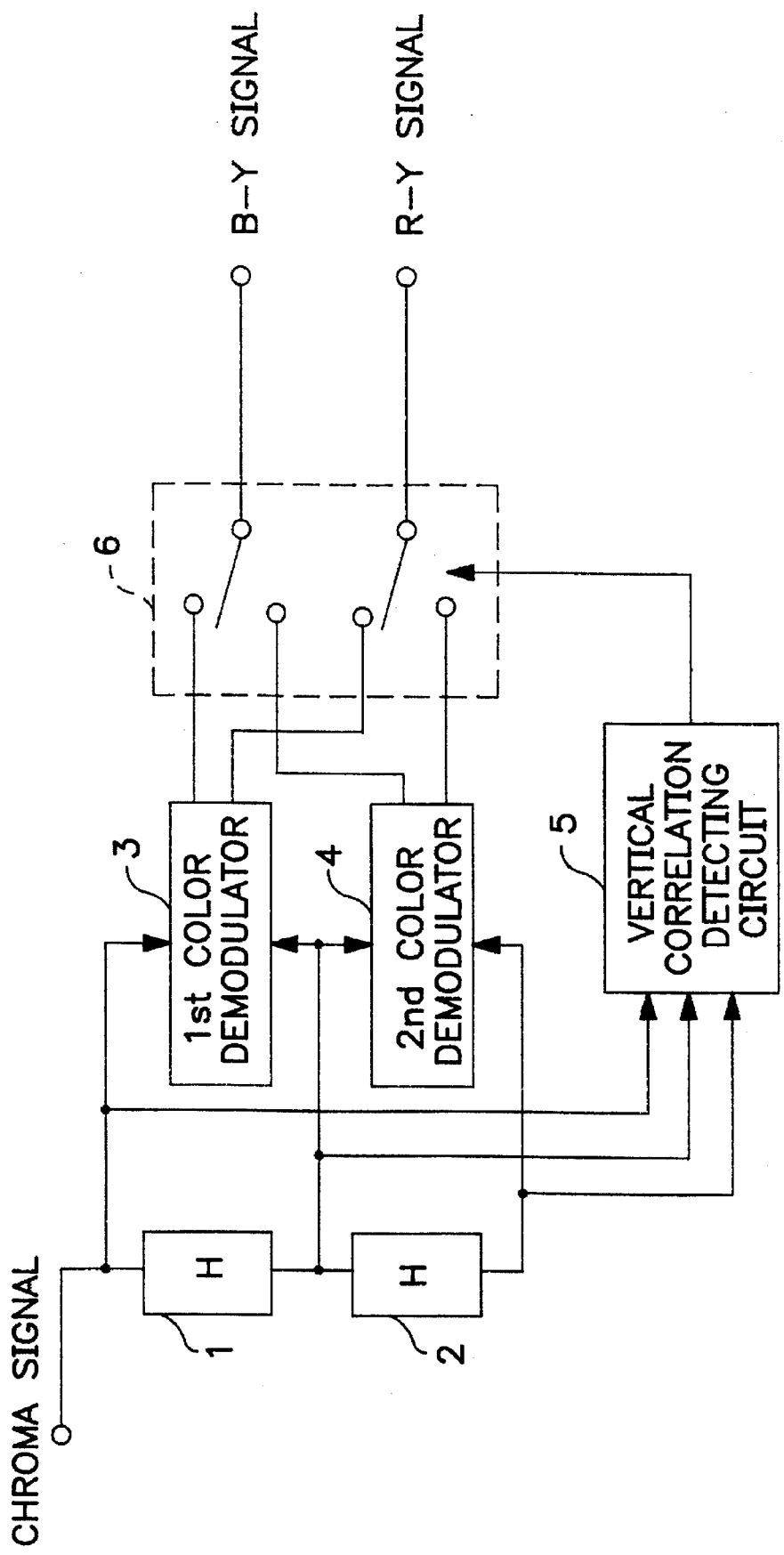
FIG. 1(a) A block construction of PAL system color demodulator which is the first embodiment 1.

FIG. 1(a) shows a block diagram of PAL system color demodulator which is a first embodiment of the invention.

In FIG. 1(a), 1 is a first 1H delay line delaying the PAL system chroma signal by one horizontal period, 2 is a second 1H delay line delaying the output of said 1H delay by one horizontal period, 3 is a first color demodulator canceling the hue error by an operation conducted between the lines of input and the output of said first 1H delay line, 4 is a second color demodulator canceling the hue error by an operation conducted between the lines of input and the output of said second 1H delay line, 5 is a vertical correlation detecting circuit detecting the vertical correlation between skid three chroma signals, and 6 is a selector selecting the output of said first color demodulator or the output of said second color demodulator in accordance to the output of said vertical correlation detector.

The operation of thus constructed PAL system color demodulator of the invention is now explained in below by referring FIG. 1(a).

The inputted chroma signal is delayed first by one horizontal period by using 1H delay line 1. In color demodulator 3, the color demodulation is conducted by using said input chroma signal and by using said chroma signal delayed by one horizontal period using 1H delay line 1 in order to output two color difference signals. Similar to the conventional first PAL system color demodulator, color demodulator 3 is able to cancel the phase distortion of chroma signal by conducting an operation between the lines.

The output of 1H delay line 1 is further delayed by one horizontal period by means of 1H delay line 2, and the color demodulation of color demodulator 4 is conducted by utilizing the chroma signal delayed by one horizontal period using said 1H delay line 1 and the chroma signal delayed by one horizontal period by means of said 1H delay line 2 in order to output two color difference signals similar to a case of color demodulator 3.

Similar to the conventional first PAL system color demodulator, color demodulator 4 is also able to cancel the phase distortion of chroma signal by conducting an operation between the lines, and to output two color difference signals similarly.

As mentioned before, correct color demodulation with the color demodulation system canceling the phase distortion by conducting an operation between the lines can not be accomplished unless no correlationship between the adjoining lines is established.

Therefore, defining the inputted chroma signal delayed by one horizontal period by using said 1H delay line as a reference signal, the vertical correlation between the reference signal and the chroma signal parted by one horizontal period front the reference line in a direction of before and after (or in a upper or lower direction) is detected by using vertical correlation detecting circuit 5, and the color difference signal obtained by an operation determining a higher correlation is selected by selector 6 and is outputted. By using this system, the PAL system color demodulation of higher accuracy can be realized.

However, in determining the vertical correlation by using vertical correlation detector 5, the phases between the lines have to be adjusted. As above-described, the fact that the R-Y signal is modulated by the sub-carrier of which phase is changed by 180 degrees at every line (that is, the sign of R-Y component is altered at every line), and that the phase of sub-carrier is advanced by 90 degrees at every line have to be noticed. Thus, before determining vertical correlation, the sign of R-Y signal and the phase sub-carrier have to be arranged in an order.

Moreover, it is necessary to know that the cosine signal is advanced by $\pi/2$ when it is squared with a sine wave having a frequency of twice of said cosine frequency and is passed through a low-pass filter eliminating signals of triple frequency.

Likewise, the sine signal is advanced by $\pi/2$ when it is squared with a sine wave having a frequency twice of said sine frequency and is passed through a low-pass filter eliminating signals having a triple frequency. Furthermore, the polarity of said sine wave is altered.

Figure 4:
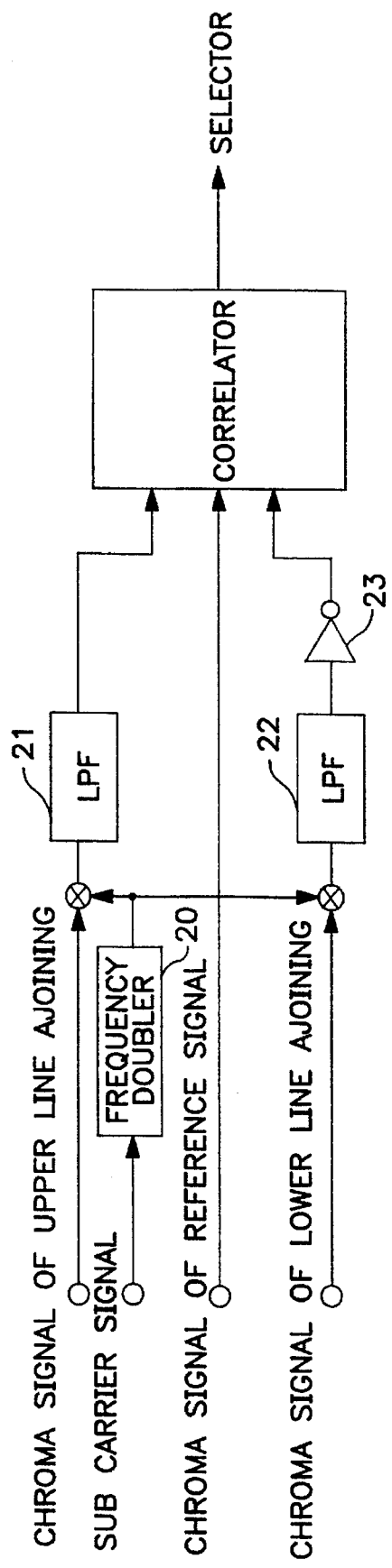
FIG. 4 A block diagram of the vertical correlation detecting circuit.

For example, in FIG. 4, to determine the vertical correlation between the reference signal and the line adjoining to the upper side of reference signal, the chroma signal of the upper adjoining line is squared by a sine signal 20 having a twice frequency of the sub-carrier frequency, and is passed through a first low-pass filter 21 cutting off a signal having a triple frequency of the sub-carrier frequency and the vertical correlation detecting circuit includes circuitry for detecting the second vertical correlation by multiplying a sinewave signal 20 having a frequency double of the sub-carrier frequency to said reference signal and the chroma signal of the line adjoining to the lower side of said reference signal and by passing through a second low pass filter 22 cutting off the sinewave signal having a triple frequency of the sub-carrier signal by changing the signs, via an inverter 23, of the signal passed through said second low pass filter. By these, the sign of R-Y signal is altered and the phase of sub-carrier signal is advanced by 90 degrees.

After conducting the phase adjustment like this, the difference between the signal and the reference signal, and the vertical correlation between these signals can be determined.

The Second Exemplary Embodiment

Figure 1B:
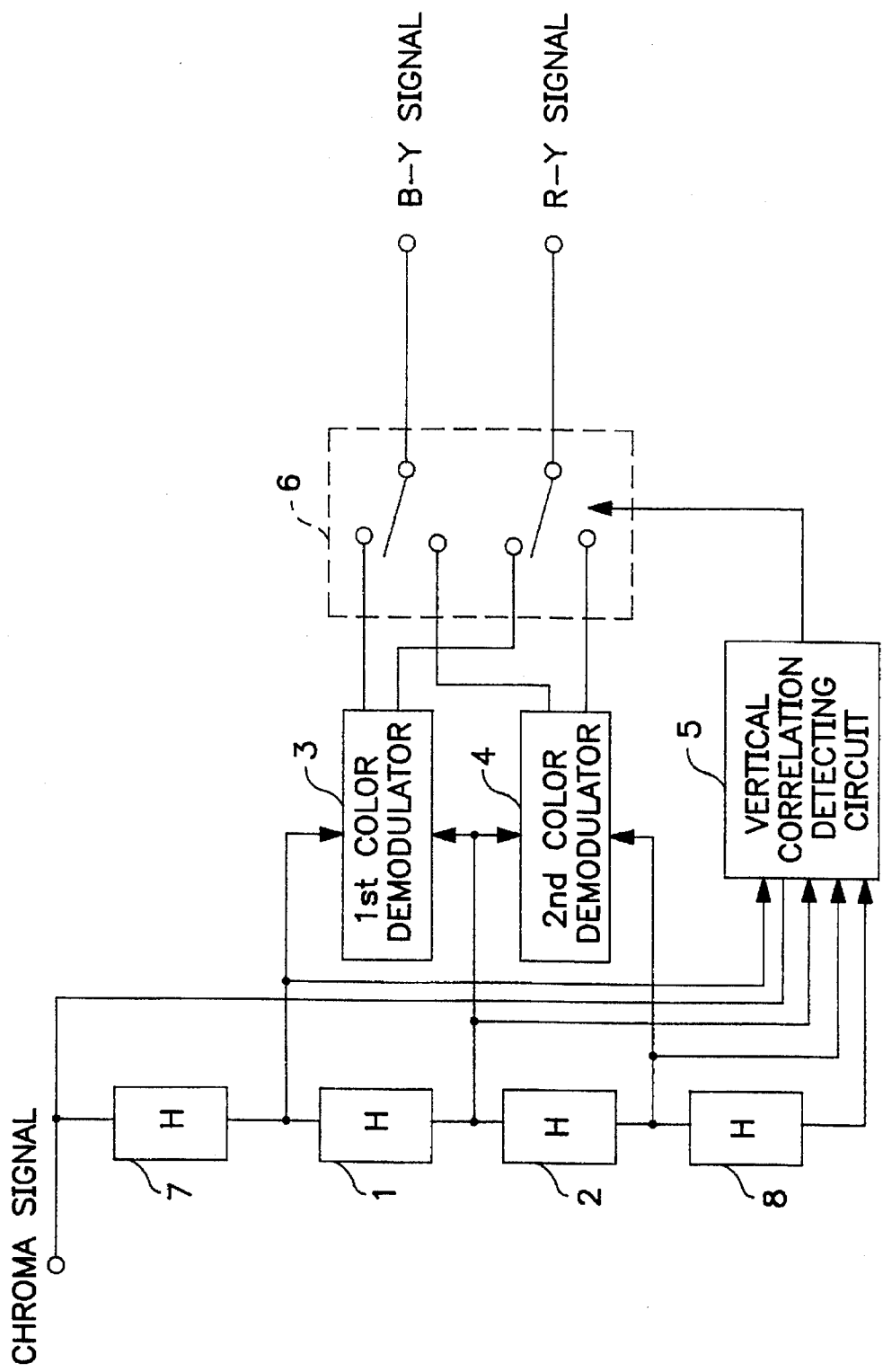
FIG. 1(b) A block construction of PAL system color demodulator which is the second embodiment 2.
Figure 2:
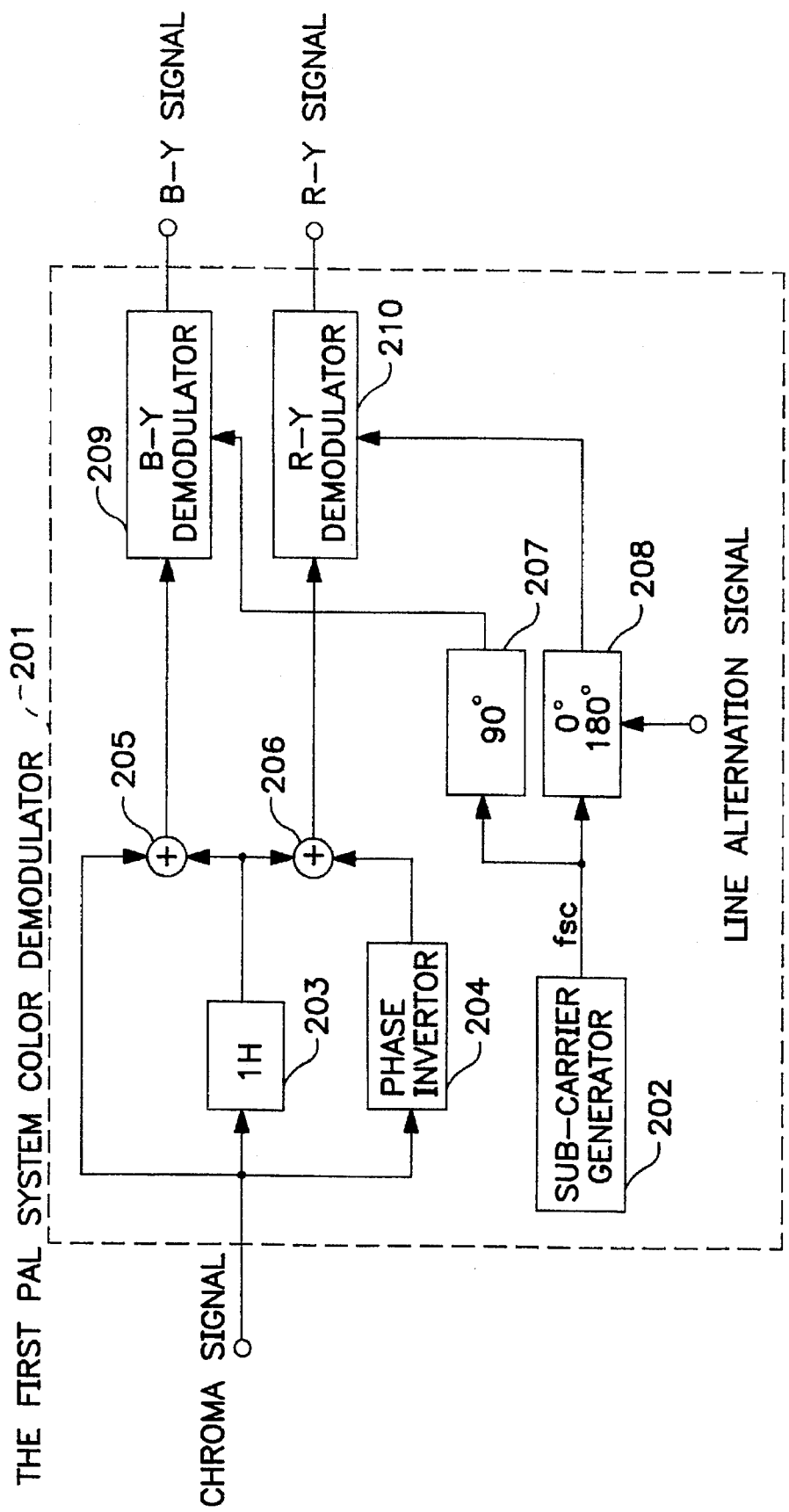
FIG. 2 A block diagram of conventional PAL system color demodulator.
Figure 3:
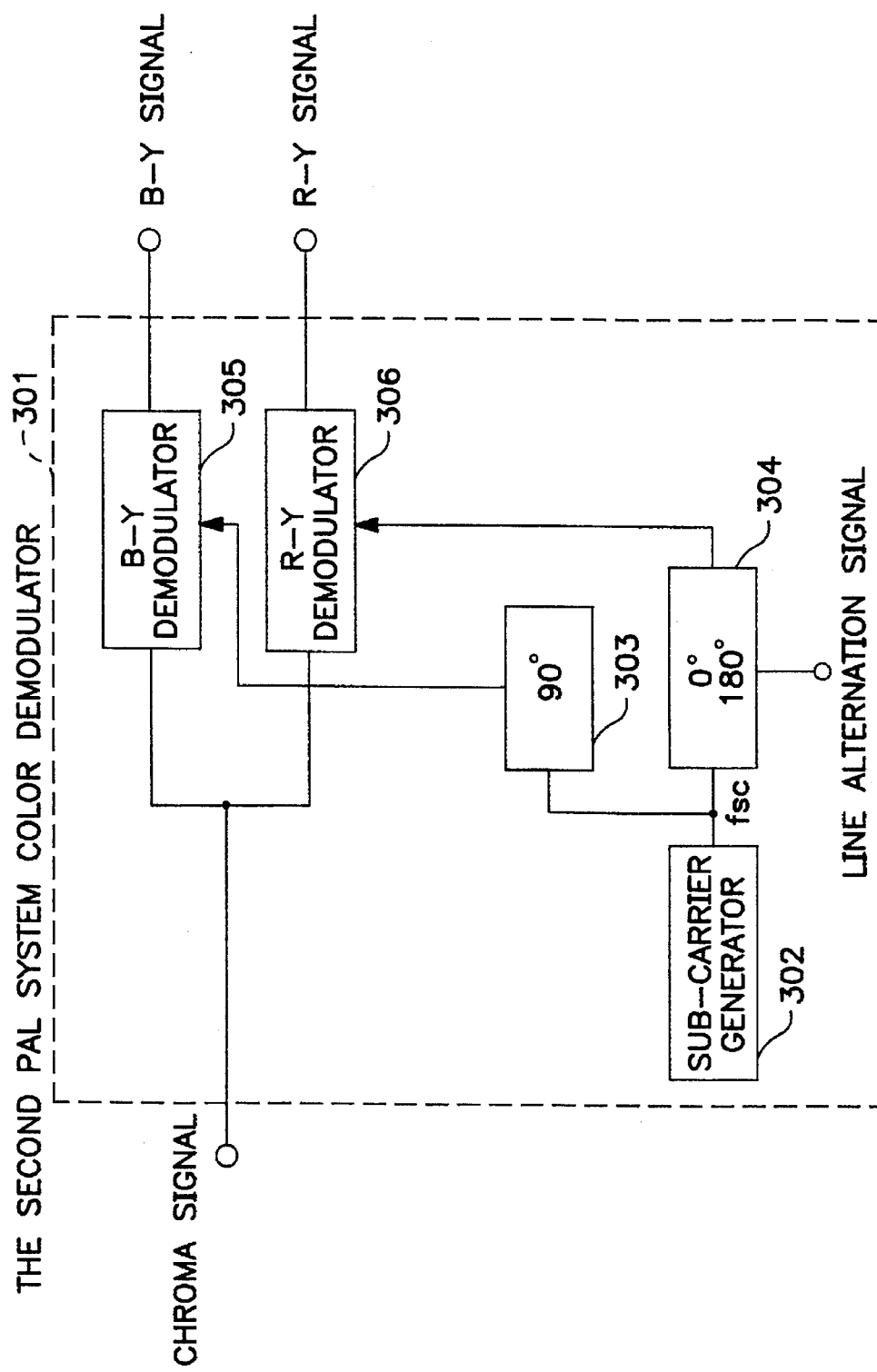
FIG. 3 Another block diagram of conventional PAL system color demodulator.

FIG. 1(b) shows a block diagram of PAL system color demodulator which is a second embodiment of the invention.

In FIG. 1(b), the components same with those shown in FIG. 1(a) are identified by the same signs shown in FIG. 1(a), and thus, only the differences from those shown in FIG. 1(a) are third 1H delay line 7 and fourth delaying 8.

In determining the vertical correlation in Embodiment 2, the reference signal, chroma signals of the lines adjoining to the before and after of said reference signal, and further, the chroma signals of the adjoining line parted from said reference signal of the reference line by one line are utilized. It is further contemplated to detect vertical correlation between the respectively phase controlled chroma signals of said reference signal and the lines adjoining to said reference line separated by a distance of plural lines.

In Embodiment 2, like the previous case of Embodiment 1, the vertical correlation between the reference signal and the chroma signals of lines adjoining to before and after of said reference signal is determined, and the vertical correlation between the reference signal and the chroma signals of the lines parted from said reference signal by one line is determined also.

Among these two cases, it is easier to determine the vertical correlation between the reference signal and the chroma signals of the adjoining lines parting by one line.

Instead of determining the correlation between the reference signal and chroma signals of the lines adjoining to the reference signal to before and after the reference signal, it is easier to determine the vertical correlation between the reference signal of reference line and the chroma signals of the lines adjoining to said reference line parting by one line.

That means that as the sign of R-Y signal of the reference line is same as the sign of R-Y signal of the line adjoining to the reference line parting by one line, and the phase of the sub-carrier signal is parted by 180 degrees, the vertical correlation can be determined by adding this signal to the reference signal.

On the other hand, the correlation could be lower when the vertical distance between these signals is larger.

In this case, the signal inputted into vertical correlation circuit 5 can be the reference signal, signal inputted into the first delay line, signal inputted to the first delay line prior by 1H, that is, the input signal to the third delay line, output signal of the second delay line, and the signal outputted 1H later than the second delay line, that is, the output of the fourth 1H delay line, and these signals are utilized to determine the vertical correlation. Among these signals, the signal having a highest correlation is detected, and is outputted to selector 6.

As mentioned before, the input signal into the color demodulator is the reference signal and the chroma signals of lines adjoining to the reference signal.

As described in the above, the present invention consists of a first 1H delay line delaying the PAL system chroma signal by one horizontal period, a second 1H delay line delaying said reference signal by one horizontal period defining the output of said first 1H delay line as a reference signal, a first color demodulation circuit canceling the hue difference by conducting an operation between the input and the output of said first 1H delay line, a second color demodulating circuit canceling the hue difference by conducting an operation between the input and the output of said second 1H delay line, a vertical correlation detecting circuit determining the vertical correlation from said reference signal and the chroma signals of adjoining lines or said reference line and the adjoining to said reference line parting by one line, and a selector selecting the output of said first color demodulating circuit or the output of said second color demodulating circuit. By this, while the hue errors of chroma signals produced in the transmission line are canceled, attaining a high quality PAL system color demodulation by detecting the correlation between the adjoining the lines and by conducting an operation between the correlated lines at the same time.

We claim:

1. A PAL system adaptive color demodulator comprising:

an input terminal for applying a PAL system chroma signal, a first 1H delay line which delays the PAL system chroma signal by one horizontal period to generate a reference signal, wherein said PAL system chroma signal corresponds to a display image line which is below a display image line which corresponds to said reference signal, and said PAL system chroma signal is defined as a lower signal, a second 1H delay line which delays the reference signal by one horizontal period to generate an upper signal which corresponds to a display image line which is above the display image line corresponding to said reference signal, a first color demodulating circuit which cancels hue error by conducting an operation between the reference signal and the lower signal, a second color demodulating circuit which cancels hue error by conducting an operation between the reference signal and the upper signal, a vertical correlation detecting circuit which detects a vertical correlation between the lower signal, the reference signal and the upper signal, and a selector selecting the output of said first color demodulating circuit or the output of said second color demodulating circuit according to the output of said vertical correlation detecting circuit.

2. A PAL system adaptive color demodulator according to claim 1, wherein said vertical correlation detecting circuit detects the vertical correlation between the reference signal and the upper and lower signals, wherein the display image lines corresponding to the upper and lower signals are separated by a distance of plural lines from the display image line which corresponds to said reference signal.

3. A PAL system adaptive color demodulator according to claim 1, wherein said vertical correlation detecting circuit includes:

a first multiplier which multiplies a sinewave signal having a frequency twice the frequency of a sub-carrier signal by the upper signal to produce a first multiplier output signal, a first low-pass filter which attenuates a component of the first multiplier output signal having a frequency that is triple the frequency of the sub-carrier signal, a second multiplier which multiplies the sinewave signal having the frequency twice the frequency of the sub-carrier signal by the lower signal to produce a second multiplier output signal, a second low-pass filter which attenuates a component of the second multiplier output signal having a frequency that is triple the frequency of the sub-carrier signal, and signal complementing means for changing the sign of the signal passed through said second low-pass filter.

4. A PAL system adaptive color demodulator according to claim 1, wherein said vertical correlation detecting circuit operates by detecting the vertical correlation by adding the chroma signal of said reference signal to the chroma signals of adjoining lines separated from said reference signal by a distance of one line.

* * * * *